D. D. DENNIS.
WATER WHEEL.
APPLICATION FILED AUG. 29, 1907.
940,677.
Patented Nov. 23, 1909.
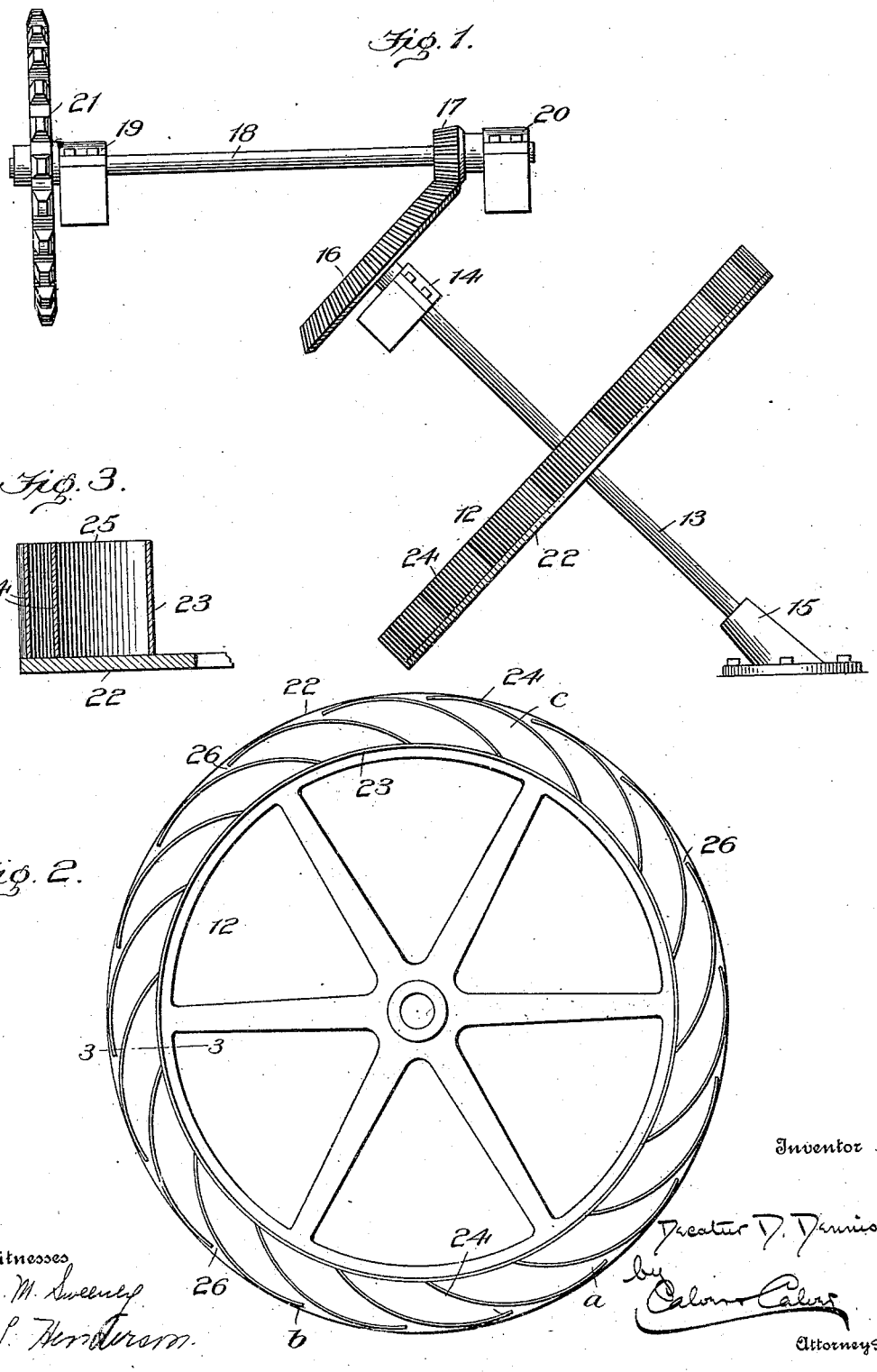

UNITED STATES PATENT OFFICE.

DECATUR D. DENNIS, OF PECOS, TEXAS.

WATER-WHEEL.

940,677.

Specification of Letters Patent.   Patented Nov. 23, 1909.

Application filed August 29, 1907.   Serial No. 390,579.

*To all whom it may concern:*

Be it known that I, DECATUR D. DENNIS, a citizen of the United States, residing at Pecos, in the county of Reeves and State of Texas, have invented or discovered certain new and useful Improvements in Water-Wheels, of which the following is a specification, reference being had therein to the accompanying drawings.

My invention relates to water wheels for developing power, more particularly to that type of water wheels known as gravity wheels, or wheels which are turned by the weight of the water contained in their buckets, and the objects thereof are to provide a wheel of the type referred to which will be productive of great power with a comparatively small head of water.

To these ends my invention comprises a water-wheel mounted to rotate upon an inclined axis and provided at its periphery with a series of buckets, open at their upper sides, and consists more particularly in the peculiar form of these buckets, whereby a substantially continuous body of water is maintained on the descending side of the wheel.

In the accompanying drawings, in which I have illustrated one construction in which my invention may be embodied:—Figure 1 is a side elevation of my improved wheel, showing the connected power transmitting mechanism; Fig. 2 is a plan view of the upper face of the wheel, and Fig. 3 is a detail sectional view, taken substantially on the line 3—3, Fig. 2.

The wheel 12 is carried by an inclined shaft 13, mounted to turn in suitable bearings 14, 15. Operatively connected to the shaft 13 are suitable power-transmitting devices, herein shown as a bevel gear 16, carried by the shaft 13 and meshing with a second bevel gear 17, carried by a shaft 18, mounted in bearings 19, 20, and provided with a sprocket wheel 21, from which power may be taken. The precise nature of the power-transmitting devices is immaterial, and they may be of any suitable type depending upon the work to be performed. The wheel 12 may, in its central portion, be constructed in any suitable manner, but at its periphery comprises a base portion 22, surmounted by a cylindrical wall 23, preferably of sheet metal. In the angle between the base portion 22 and wall 23, and preferably secured to both, are a plurality of wings or blades 24, also preferably of sheet metal, forming the buckets of the wheel. The wings or blades 24 are preferably constructed and arranged as shown in Fig. 2, each being, in plan, formed substantially on the arc of a circle, each forming an acute angle with the wall 23 and extending outwardly and rearwardly therefrom, and each curving slightly inwardly at its outer end and approaching relatively near to the next succeeding wing or blade.

From the foregoing it will be seen that a series of overlapping buckets are formed, each having an open upper side 25 and a restricted discharge opening 26 at its outer edge. These buckets are filled through their open sides 25 and remain substantially full until they arrive at the lowermost point of the wheel, where the water is slowly discharged through the openings 26. My wheel is adapted for use in localities in which a relatively large quantity of water is available at a relatively low head, the requisite power being generated by a relatively great force acting at a low velocity. The wheel, therefore, moving at a slow rate of speed, allows ample time for the proper discharge of the water through the openings 26. It will furthermore be seen that, since the buckets overlap, and since they are prevented from discharging any of their load during the major part of their downward travel, a substantially continuous body of water is maintained on the descending side of the wheel, and that this body remains substantially constant during the whole of the effective movement of the buckets, there being very little loss of water from the buckets as they approach their lowermost position.

In the operation of my wheel the buckets are filled, through their open sides 25, at substantially the point c, Fig. 2. From this point the buckets move downwardly without discharging any of their load until the point a, Fig. 2, is reached, from which point a slow discharge through the openings 26 is kept up until the buckets approach the point b, Fig. 2. The low velocity of the wheel allows ample time for the proper discharge of the buckets at this time, very little, if any, water being carried beyond the lowermost point of the wheel.

My wheel is particularly useful for purposes of irrigation where a low fall in a stream is depended upon to furnish the necessary power to raise water to a point above the level of the stream, although it will be obvious that my apparatus is not limited to this use, it being equally useful for many other purposes.

While I, in order that my invention may be readily understood, have shown and described the same as embodied in a particular construction, I wish it to be distinctly understood that I do not limit myself to the precise construction shown, it being obvious that many changes might be made therein without departing from the spirit and scope of my invention.

Having thus described my invention, what I claim as new and desire to secure by Letters Patent is:—

A gravity water wheel mounted to rotate on an inclined axis and comprising a base member, a cylindrical wall mounted on said base member, and a series of overlapping wings or blades extending outwardly and rearwardly from said wall, said wings or blades having their outer ends turned inwardly toward the axis of the wheel and forming a series of overlapping buckets each provided with an open upper side and a restricted discharge opening.

In testimony whereof I affix my signature, in presence of two witnesses.

DECATUR D. DENNIS.

Witnesses:
J. F McKenzie,
J. F. Ball.